2,985,837
STABILIZED TIME FUZE CIRCUIT

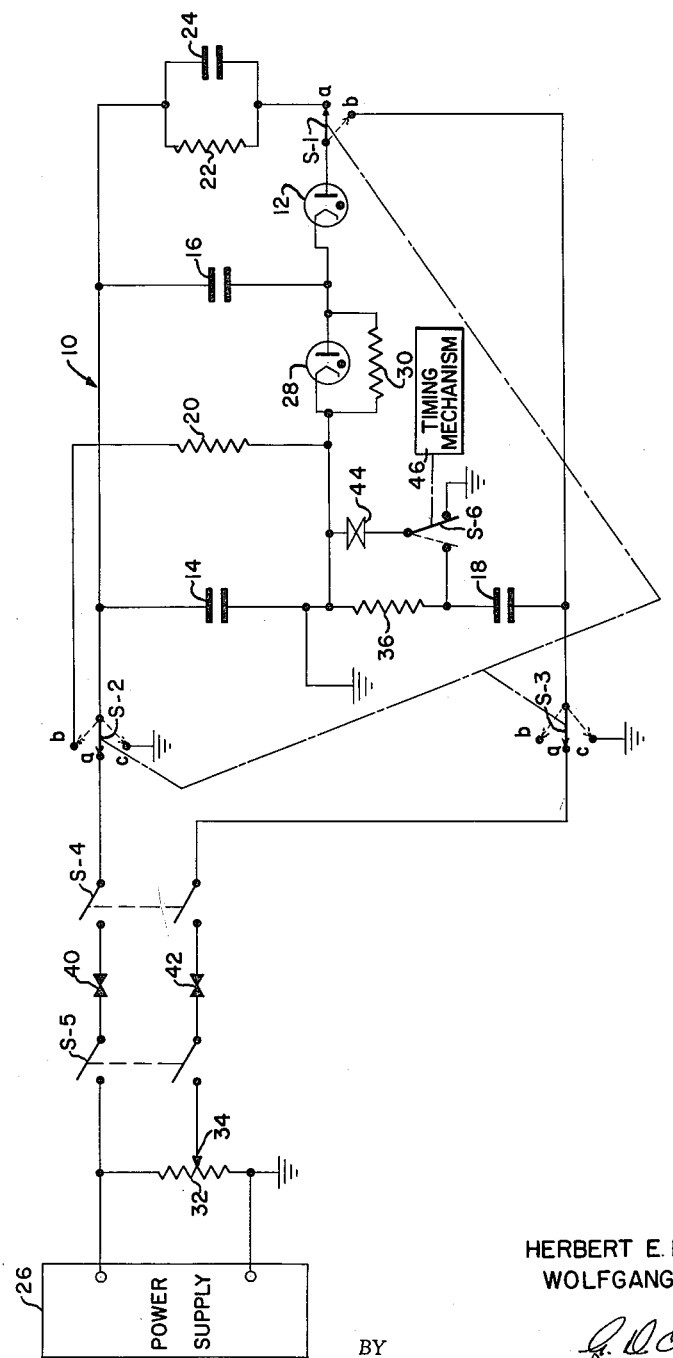

Herbert E. Ruehlemann and Wolfgang E. Menzel, Silver Spring, Md., assignors to the United States of America as represented by the Secretary of the Navy Filed July 2, 1953, Ser. No. 365,790

7 Claims. (Cl. 328—72)

(Granted under Title 35, U.S. Code (1952), sec. 266)

The invention described herein may be manufactured and used by or for the Government of the United States of America for governmental purposes without the payment of any royalties thereon or therefor.

This invention relates to timing devices and more particularly pertains to electric timing devices for use in ordnance fuzes.

In the copending application of Herbert E. Ruehlmann, Serial No. 219,302, filed April 4, 1951 and the copending application of Herbert E. Ruehlmann et al., Serial No. 290,374, filed May 27, 1952, now Patent No. 2,910,001, time measuring devices are disclosed for measuring predetermined time intervals, which measured time intervals are independent of variations in breakdown potential of the discharge device associated with the circuit, and also independent of the stability of the charging potential. Such time measuring devices employ three condensers and an electron discharge device. One of the condensers, hereinafter referred to as the timing condenser, is charged to a predetermined voltage and during the timing cycle is discharged through a resistance thereby providing a voltage which decays exponentially with respect to time. A second condenser referred to as the reference condenser is initially charged to a voltage proportional to, but less than the voltage applied to timing condenser, the third condenser referred to as the stabilizing condenser being initially charged to voltage greater than the breakdown potential of the discharging device and then stabilized at a voltage equal to the discharge device breakdown potential. During the timing cycle, the condensers are connected in series circuit with discharge device, the condensers being arranged so that the potential on the reference condenser aids the potential on the stabilizing condenser, and opposes the potential on the timing condenser. The timing condenser is connected to a resistance discharge path during the timing cycle and when the potential thereon decays to a value equal to the potential on the reference condenser, the discharge device is rendered conducting thereby actuating a utility device such as a fuze.

Thus, the time measurement is a period which is dependent only on the rate of decay of the voltage on the timing condenser through the resistive discharge path and proportionality factor between the potential applied to the timing condenser and the potential applied to the reference condenser, and independent of variations of breakdown potential of the discharge device and also independent of variations of the supply voltage utilized to charge the condensers.

In order to maintain the proportionality factor constant between the potential applied to the timing condenser and the potential applied to the reference condenser, it has heretofore been proposed to charge the reference condenser in series with the stabilizing condenser and to proportion the values of the stabilizing and reference condensers so that the proportionality factor is a predetermined value. However, this necessitated a critical matching of the capacity values of the reference and stabilizing condensers. Thereafter, there was proposed in the copending application Serial No. 290,374 to charge each of the condensers separately. This necessitated 3 separate leads to the timing circuit, one which applied a variable voltage to the timing condenser to thereby permit variations in the time measurement; a second lead to apply a voltage to the stabilizing condenser which was greater than the breakdown potential of the discharge device; and a third lead to apply a voltage to the reference condenser proportional to the voltage applied to the timing condenser. In certain applications of the timing device, such as in ordnance fuzes, wherein three separate charging voltages must be supplied from a remote power supply, the use of three separate charging leads is undesirable.

An important object of this invention is to reduce the number of leads necessary for the independent charging of the condensers in a voltage stabilized timing circuit.

Another object of this invention is to reduce the effects of changes in dielectric absorption for different charging voltages in a voltage stabilized timing circuit.

Another object of this invention is to increase the rate of voltage decay at the ignition point of the discharge in a voltage stabilized timing circuit for short time settings to thereby increase the accuracy of the timing device for short time settings.

A further object of this invention is to permit higher rate of change in time settings from a given power supply source.

Other objects and many of the attendant advantages of this invention will be readily appreciated as the same becomes better understood by reference to the following detailed description when considered in connection with the accompanying drawing wherein:

The solitary figure is a schematic diagram of a voltage stabilized timing circuit in which the measured time interval is varied by varying the potential applied to the reference condenser.

The timing circuit, indicated generally by the numeral 10, employs a discharge device 12 such as a cold cathode gas diode which is rendered conducting after a predetermined time delay, which time delay is independent of variations in diode breakdown potential and also independent of the stability of the charging potential.

More specifically, the circuit comprises a timing condenser 14, a stabilizing condenser 16, and a reference condenser 18. During the timing cycle, the aforementioned condensers are arranged in series circuit with the diode 12, with the potential on the reference condenser 18 aiding the potential on the stabilizing condenser 16 and opposing the potential on the timing condenser 14. The timing condenser 14 is arranged to discharge through a resistive discharge path such as the resistance 20, and when the voltage on the timing condenser 14 decays to a value which is less than the additive potentials on the reference condenser 18 and the stabilizing condenser 16 by an amount equal to the diode breakdown potential, the diode 12 is rendered conducting.

Prior to the initiation of the timing cycle, the stabilizing condenser 16 is charged to a potential greater than the breakdown potential of the discharge device 12, and then stabilized at a voltage equal to the breakdown potential of the discharge device. For this purpose, various types of stabilizing circuits may be employed, some of which are disclosed in the copending application, Serial No. 219,302. In the stabilizing circuit illustrated in the drawing, the diode 12 is arranged for connection, as by switch $S_1$ to the stabilizing circuit comprising a resistor 22 and condenser 24, arranged in parallel with each other, and in series with the diode 12 and the stabilizing condenser 16. During the stabilization cycle, the voltage on condenser 16 which is initially greater than the breakdown potential of diode 12 causes the latter to break down, thereby charging the condenser 24. When the voltage on the condenser 24 becomes such that the differential between the voltage on condenser 16 and the voltage on condenser 24 is equal to or slightly less than the conduction potential of the diode 12, the latter is rendered non-conducting, and condenser 24 then discharges through resistor 22 until the differential between the voltage on condenser 16 and voltage on the condenser 24 again exceeds the breakdown potential of the diode 12. The cyclic charging and discharging of condenser 24 continues until the potential on the stabilizing condenser 16 is lowered to a value just below the breakdown potential of the diode 12 so that further stabilization steps are not possible.

Since the diode 12, during the timing cycle, is rendered conducting when the additive potentials on the reference condenser 18 and on the stabilizing condenser 16 exceed the potential on the timing condenser 14, by an amount equal to the breakdown potential of the diode 12, and since the potential on the stabilizing condenser 16 has previously been stabilized at a value equal to the breakdown potential of the diode 12, it is deemed apparent that the diode 12 is rendered conducting whenever the potential on the reference condenser 18 exceeds the potential on the timing condenser 14, by a small amount.

In accordance with the present invention, the condensers in the timing circuit are charged from a power supply source 26, a voltage of substantially constant amplitude being applied through switch $S_2$ to the timing condenser 14. The stabilizing condenser 16 is charged in parallel with the timing condenser through the diode 28. The voltage from the power supply source 26 may be either a pulse voltage, in which case only a diode such as 28 need be provided to charge the stabilizing condenser, or the voltage may be a continuous voltage in which case a high resistance 30 is preferably provided in parallel with the diode 28.

A selectively variable voltage which is proportional to the output of the power supply 26 is provided by the potentiometer 32 having a tap 34 thereon. As is clearly illustrated in the drawing, the voltage appearing at tap 34 is applied through the switch $S_3$ across the series circuit comprising the reference condenser 18 and the resistor 36. In this manner, the reference condenser is charged to a voltage which is proportional to the voltage applied to the timing condenser 14.

The timing device of the present invention was particularly designed to control the actuation of a fuze of a bomb, rocket, or the like, and switches $S_1$, $S_2$ and $S_3$ are arranged to be simultaneously actuated by the missile supporting device such as an aircraft bomb rack or rocket launching mechanism so that switches $S_1$, $S_2$ and $S_3$ are moved from position $a$ to position $b$ in response to release of the missile. As is conventional, the timing circuit on the fuze is coupled to the power supply 26 by way of plug connectors 40 and 42, a switch $S_4$ being provided to disconnect the connectors 40 and 42 from the timing circuit after release of the missile to thereby prevent moisture or the like on the surface of the missile from discharging the condensers, the switch $S_4$ being actuated in response to release of the missile from its supporting device. Further, a switch $S_5$ may be provided to control application of the charging voltages to the timing circuit.

The utility device such as the fuze detonator 44 is connected in shunt with the resistor 36, through a switch S–6, which switch is coupled to any one of many well known timing mechanisms 46, such for example as a clock, for operation from its initial position to a moved position after sufficient time has lapsed for the operation of ganged switches $S_1$, $S_2$ and $S_3$, whereby the device is actuated when the discharge device 12 is rendered conducting.

In operation, the switches $S_2$ and $S_3$ are initially moved to position $c$ to thereby discharge the timing condenser 14, the stabilizing condenser 16, and the reference condenser 18. Thereafter the switches $S_1$, $S_2$ and $S_3$ are moved to position $a$ whereby condenser 14 is charged to a potential equal to the output potential of the power supply, and stabilizing condenser 16 is charged to a potential which is less than the output of the power supply by an amount equal to the extinguishing potential of the diode 28. With the pulse type charging system, resistor 30 is omitted, and the aforementioned stabilization process whereby stabilizing condenser 16 is discharged to a value equal to the breakdown potential of the diode 12 is commenced. However, with a continuous charge system, a high resistance 30 is provided in shunt with the diode 28 so that the stabilization process can commence as soon as the stabilizing condenser 16 has been connected to the power supply source. The resistor 30 limits the rate of charge of the condenser 16 whereby the stabilization of condenser 16 continues, as previously described, until the voltage across condenser 16 becomes equal to the breakdown potential of diode 12. However, since condenser 16 is slowly recharged through resistance 30, the stabilization process is resumed whenever the voltage on condenser 16 exceeds the diode breakdown potential. In this manner, the voltage across condenser 16 becomes substantially equal to the breakdown potential of diode 12, and will be stabilized at that value within an extremely short time interval after disconnecting the timing circuit from the power supply source.

The switches $S_1$, $S_2$ and $S_3$ are moved from position $a$ to position $b$, in response to release of the missile from the missile supporting device, a short time delay preferably being provided between the release and consequent disconnection of the timing device of the power supply source, and the initiation of the timing cycle in order to permit the stabilization of the voltage on condenser 16 to proceed to completion so as to equal the breakdown potential of the diode 12. The specific delay mechanism utilized is conventional, and forms no part of this invention.

As is apparent from the drawing, movement of switches $S_2$ and $S_3$ to position $b$ disconnects the timing device from the input leads, switch $S_2$ also serving to connect the resistor 20 in parallel with the timing condenser 14. Movement of switch $S_1$ from position $a$ to position $b$ disconnects the discharge device 12 from the stabilizing circuit and connects the timing condenser 14, the stabilizing condenser 16, and the reference condenser 18 in series with the diode 12, switch $S_1$ also serving to disconnect the stabilizing circuit from the diode. When the switch $S_2$ is moved to position $b$ to connect the resistance 20 in parallel with the timing condenser 14, the voltage across the timing condenser decays at a rate determined by the RC time constant of the circuit. No discharge of condenser 14 through the parallel path of condenser 16 and diode 28 occurs when a pulse type energization source is employed because the charge on condenser 14 is less than the charge on condenser 16 and the breakdown potential necessary to render the gas diode 28 conductive. When a continuous type energization source is employed the relatively high magnitude of resistor 30 prevents any nominal discharge through the parallel path. When the potential on condenser 14 decays to a value equal to the potential on the reference condenser 18, the combined additive potentials of the condenser 18 and the stabilizing condenser 16 exceed the potential on condenser 14 by an amount equal to the breakdown voltage of the diode 12, and the latter is rendered conducting thereby actuating the utility device such as detonator 44. As is deemed apparent, by charging the stabilizing condenser 16 through a high, preferably unidirectional impedance such as the diode 28, with or without the shunt resistance 30 depending on the type of charge applied, in parallel with the timing condenser 14, and by applying a selectively variable voltage to the reference condenser 18, which variable voltage is proportional to the constant voltage applied to the timing condenser 14, a stabilized timing circuit is provided which necessitates only two leads to connect the latter to the power supply source. Additionally, the timing circuit provides a selectively variable time measurement dependent upon the amplitude of the voltage applied to the reference condenser 18, which time measurement is independent of variations in the diode breakdown potential and also independent of the stability of charging source.

Since the accuracy of very high resistances cannot be maintained within closed limits, it is necessary that the condenser 14 have a relatively large capacitance in order to provide the required RC time constant for long time intervals. In the prior devices in which the variable timing voltage was applied to the timing condenser 14, the variations in dielectric absorption in the condenser, with varying applied voltages, varied the time constant of the timing circuit comprising condenser 14 and resistor 20, and introduced inaccuracies in the time measurement. In the circuit illustrated, the timing condenser 14, for all time settings, is charged to the same potential and any influence from dielectric absorption is of the same order for all the different time settings whereby the voltage on the firing condenser can be accurately predicted. As hereinbefore set forth, changing of the measured time intervals is achieved by varying the potential applied to the reference condenser 18. Since the potential on the reference condenser remains at the set value during the timing cycle the effects of dielectric absorption on the voltage of this condenser is negligible.

Varying the potential on the reference condenser 18 to effect changing of the time measurements has an additional advantage in that the capacitance of condenser 18 may be small as compared to that of the timing condenser 14. Consequently a change in the voltage on the reference condenser by varying the position of the tap 34 on the potentiometer 32 will be achieved within a relatively short time interval from a supply source of a given impedance since the time constant of the circuit is small. In contrast, if the voltage on the timing condenser were changed to effect a change in the measured time interval, the impedance of the power supply must be lower to permit the same rate of change time setting. This necessitates a higher wattage power supply which is undesirable.

Changing of the voltage on the reference condenser 18, to change the measured time interval, has an additional advantage in that, at short time settings, the voltage decay at the ignition point of the diode 12 is several times higher than the long time settings due to the more rapid decay occurring during the initial portion of the well known exponential curve discharge characteristic of a condenser. This results in increased accuracy at short time settings without any decrease in accuracy at long time settings.

In the circuit illustrated in the drawings, the diode 28 not only serves to permit rapid charging of the stabilizing condenser 16 during the charging cycle, but in addition serves as a switch during the timing cycle to prevent discharge of the stabilizing condenser 16 through resistor 20. In those applications utilizing a continuous charge system as contrasted to a pulse charge system and in which the shunt resistor 30 is employed, the discharging of condenser 16 through resistor 20 is not appreciable since the resistance of resistor 30 is high.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A timing circuit comprising an electron discharge device, a timing condenser, a stabilizing condenser and a reference condenser, means including an asymmetrical impedance element connecting said stabilizing condenser in parallel with said timing condenser, means connecting one electrode of said discharge device to the junction of said asymmetrical impedance and said stabilizing condenser, a stabilizing circuit connected in parallel with said stabilizing condenser and said discharge device, means connecting one side of said reference condenser to the junction between said timing condenser and said impedance element, means for applying a predetermined fixed voltage across said timing condenser, means for applying a selectively variable voltage across said reference condenser, a resistive discharge path for discharging said timing condenser at a preselected rate, switch means for selectively disconnecting said discharge device from said stabilizing circuit and for connecting said discharge device to the other side of said reference condenser whereby said discharge device may be selectively connected first in a series circuit with said stabilizing circuit and said stabilizing condenser to discharge the latter to a value equal to the breakdown potential of the discharge device, and for subsequently connecting said discharge device in a series circuit with the timing condenser, the reference condenser and the stabilizing condenser wherein the charges on said stabilizing and reference condensers oppose the charge on said timing condenser, and an initially ineffective electroresponsive utilization device selectively interposed between said reference condenser and the junction of said asymmetrical impedance and said stabilizing condenser, said utilization device being rendered effective when the charge on said timing condenser is reduced to a preselected lower level by said resistive discharge path.

2. The combination of claim 1 wherein said stabilizing circuit comprises a condenser and a resistor connected in parallel.

3. An electrical timing system comprising an energizing source, an electroresponsive utilization device, a first energy storage device connectable to said source and chargeable therefrom to a first predetermined charge level, a first asymmetrically conductive gas discharge element, a second energy storage device connectable through said first element to said source and chargeable therefrom to a second predetermined charge level, said second charge level being lower than said first charge level by the magnitude of the extinguishing potential of said first element, a first resistor, a third energy storage device connectable through said first resistor to a preselected portion of said source and chargeable therefrom to a third predetermined charge level, said third charge level being less than said first charge level, a second asymmetrically conductive gas discharge element, an R-C network connectable across said second energy storage device through said second gas discharge element for reducing the charge on said second energy storage device to a level equivalent to the breakdown potential of said second gas discharge element, a second resistor connectable across said first energy storage device subsequent to the charging thereof to said first predetermined charge level for effecting a discharge thereof at a predetermined discharge rate, first circuit switching means for initially connecting said energy storage devices to said source and for subsequentially connecting said second resistor across said first energy storage device, and second circuit switching means for serially connecting said energy storage devices and said second gas discharge element to said utilization device for effecting operation thereof when the charge on said first energy storage device is reduced to a level where the difference between the charge thereon and said second and third energy storage devices is equivalent to the breakdown potential of said second gas discharge element.

4. An electrical timing system according to claim 3 wherein said first, second and third energy storage devices each comprises a condenser.

5. An electrical timing system according to claim 3 wherein said first and second circuit switching means are mechanically ganged for movement in unison.

6. An electrical timing system according to claim 3 wherein said first and second asymmetrically conductive gas discharge elements each comprises a gas diode.

7. An electrical timing system according to claim 3 including third circuit switching means for belatedly connecting said electroresponsive utilization device across said first resistor.

References Cited in the file of this patent

UNITED STATES PATENTS

| | | |
|---|---|---|
| 1,907,279 | Blomberg | May 2, 1933 |
| 2,404,553 | Wales | July 23, 1946 |
| 2,658,141 | Kurland | Nov. 3, 1953 |